(12) United States Patent
Mirbach et al.

(10) Patent No.: US 10,275,857 B2
(45) Date of Patent: Apr. 30, 2019

(54) DEPTH IMAGE ENHANCEMENT METHOD

(71) Applicant: IEE International Electronics & Engineering S.A., Echternach (LU)

(72) Inventors: Bruno Mirbach, Konz (DE); Thomas Solignac, Luttange (FR); Frederic Garcia Becerro, Palafrugell (ES); Djamila Aouada, Strassen (LU)

(73) Assignee: IEE INTERNATIONAL ELECTRONICS & ENGINEERING S.A., Echternach (LU)

( * ) Notice: Subject to any disclaimer, the term of this patent is extended or adjusted under 35 U.S.C. 154(b) by 69 days.

(21) Appl. No.: 14/429,137

(22) PCT Filed: Sep. 9, 2013

(86) PCT No.: PCT/EP2013/068632
§ 371 (c)(1),
(2) Date: Mar. 18, 2015

(87) PCT Pub. No.: WO2014/044569
PCT Pub. Date: Mar. 27, 2014

(65) Prior Publication Data
US 2015/0235351 A1  Aug. 20, 2015

(30) Foreign Application Priority Data
Sep. 18, 2012 (LU) .......................... 92074

(51) Int. Cl.
*G06K 9/00* (2006.01)
*G06T 5/00* (2006.01)
(Continued)

(52) U.S. Cl.
CPC ............ *G06T 5/002* (2013.01); *G06T 7/0075* (2013.01); *H04N 13/122* (2018.05);
(Continued)

(58) Field of Classification Search
None
See application file for complete search history.

(56) References Cited

U.S. PATENT DOCUMENTS

| | | | |
|---|---|---|---|
| 2010/0194856 A1 | 8/2010 | Varekamp | |
| 2010/0315488 A1* | 12/2010 | Kim | H04N 13/0018 348/46 |

(Continued)

FOREIGN PATENT DOCUMENTS

| | | |
|---|---|---|
| CN | 101923728 A | 12/2010 |
| CN | 102098528 A | 6/2011 |

(Continued)

OTHER PUBLICATIONS

Garcia Frederic et al., "A new multi-lateral filter for real-time depth enhancement" 8th IEEE International Conference on Advanced Video and Signal-Based Surveillance (AVSS); Aug. 30, 2011; pp. 42-47; XP032053721.*

(Continued)

*Primary Examiner* — Fred H Hu
(74) *Attorney, Agent, or Firm* — Reising Ethington P.C.

(57) ABSTRACT

A method for enhancing a depth image of a scene, comprises calculating an enhanced depth image by blending a first filtered depth image with a second filtered depth image or with the original depth image. The blending is achieved by application of a blending map, which defines, for each pixel, a contribution to the enhanced depth image of the corresponding pixel of the first filtered depth image and of the corresponding pixel of either the second filtered depth image or the original depth image. For pixels in the depth image containing no depth value or an invalid depth value, the blending map defines a zero contribution of the correspond- (Continued)

ing pixel of the second filtered depth image and a 100% contribution of the corresponding pixel of the first filtered image.

18 Claims, 4 Drawing Sheets

(51) Int. Cl.
  *G06T 7/00* (2017.01)
  *H04N 13/122* (2018.01)
  *H04N 13/00* (2018.01)
(52) U.S. Cl.
  CPC ............... *G06T 2207/10028* (2013.01); *G06T 2207/20012* (2013.01); *G06T 2207/20028* (2013.01); *G06T 2207/20221* (2013.01); *H04N 2013/0081* (2013.01)

(56) References Cited

U.S. PATENT DOCUMENTS

| | | | |
|---|---|---|---|
| 2011/0210969 A1 | 9/2011 | Barenbrug | |
| 2011/0285910 A1 | 11/2011 | Bamji et al. | |
| 2012/0230601 A1 | 9/2012 | Iso et al. | |
| 2014/0079336 A1* | 3/2014 | Venkataraman | G06T 5/005 382/275 |

FOREIGN PATENT DOCUMENTS

| | | |
|---|---|---|
| CN | 102203829 A | 9/2011 |
| CN | 102387374 A | 3/2012 |
| CN | 102447939 A | 5/2012 |
| JP | 2010218549 A | 9/2010 |
| WO | 2009047681 A1 | 4/2009 |

OTHER PUBLICATIONS

Derek Chan et al. "A Noise-Aware Filter for Real-Time Depth Upsampling", Workshop on Multi-camera and Multi-modal Sensor Fusion Algorithms and Applications—M2SFA2; Oct. 5, 2008; pp. 1-12; XP002632172.
International Search Report and Written Opinion dated Oct. 8, 2013 re: Application No. PCT/EP2013/068632; citing: Frederic et al. "A new multi-lateral . . . ", Chan et al. "A noise-aware filter . . . " and US 2011/285910 A1.
English Translation of Chinese Office Action for Application No. 201380054638.7 dated Mar. 25, 2016.

\* cited by examiner

DEPTH IMAGE ENHANCEMENT METHOD

TECHNICAL FIELD

The present invention generally relates to the field of image processing, in particular, to enhancing a depth image when a corresponding intensity image is available.

BACKGROUND ART

Computer vision applications based on 3D imaging (three-dimensional imaging) have gained increasing attention from the scientific community in the recent years. This is due, at least in part, to a growing demand in industry for autonomous systems capable of sensing the shape and location of objects in a scene.

In recent years, 3D cameras based on the Time-of-Flight (ToF) principle have become commercially available. Compared to 2D cameras, they measure, for each pixel, a radial distance of a point in the scene to the camera, while 2D cameras provide only a gray- or color image of the scene (hereinafter referred to as "intensity image"). Other 3D imagers are based on triangulation. Passive triangulation (without active illumination of the scene) is known as stereopsis or stereovision. Active systems employ laser or structured light techniques. Triangulation methods are typically more computationally intensive since the depth value has to be calculated for each pixel. In case of stereoscopic imaging, this involves solving the so-called correspondence problem (identification of corresponding objects in the two half-images). When a structured light technique is used, typically several illumination patterns have to be processed. Nevertheless, 3D imagers, based on stereoscopy or structured light, providing high-resolution depth maps in real-time have meanwhile become available. Microsoft's Kinect™ is currently the most popular example of a 3D imager using structured light technology.

Whichever of the known depth sensing techniques is used, benefits can be gained by combining the depth images with intensity images from a 2D camera. Today's ToF cameras have much lower resolution than common 2D cameras and the depth measurement is affected by noise. Fusing the data of a 2D and a 3D ToF camera may be used to overcome the mentioned limitations of 3D cameras. Stereoscopic imagers typically provide depth images with acceptable resolution but they suffer from another drawback, since they cannot reliably assign a depth value to pixels, which are seen by only one of the cameras. Furthermore, determination of depth values is less reliable in areas with poor contrast. Both effects may result in the depth image containing areas without depth values or with depth values that must be considered unreliable. A similar problem exists for structured-light imagers. For them to be able to sense any depths, the illumination unit and the camera must be separated by a baseline. This will inevitably result in occlusion or shadowing effects. Areas, which, as seen from the camera, are shadowed from the illumination unit, cannot directly be attributed any depth values.

The present invention proposes a method, which addresses these problems. The accuracy and resolution of a depth image (also: "distance image") is enhanced by fusing the depth image with an intensity image. For the purpose of the present document, it is assumed that pixel matching has already taken place, if necessary. In other words, for each pixel of the depth image there is one corresponding pixel in the intensity image and vice-versa, where pixels are considered to correspond if they relate to (image) the same part of the scene.

The method presented herein is based on a further development of the method presented in the article "A New Multi-lateral Filter for Real-Time Depth Enhancement", by F. Garcia, D. Aouada, B. Mirbach, T. Solignac, B. Ottersten, Proceedings of the $8^{th}$ IEEE International Conference on Advanced Video and Signal-Based Surveillance, 2011. The method proposed in that article relates to enhancement of depth images acquired with a ToF camera and refines the Joint Bilateral Upsampling (JBU) filter, which is defined by $$J_1(p) = \frac{\sum_{q \in N(p)} f_S(p,q) f_I(I(p), I(q)) R(q)}{\sum_{q \in N(p)} f_S(p,q) f_I(I(p), I(q))} \quad \text{(Eq. 1)}$$

where p and q designate pixels, R(.) designates the depth image (R(q) is the depth value of pixel q), N(p) designates a neighborhood of pixel p. Pixel p may be a position vector $p=(i,j)^T$, with i and j indicating the row and column, respectively, corresponding to the pixel position. This non-iterative filter formulation is a weighted average of the local neighborhood samples, where the weights are computed based on spatial and radiometric distances between the center of the considered sample and the neighboring samples. Thus, its kernel is decomposed into a spatial weighting term $f_S(.)$ that applies to the pixel position p, and a range weighting term $f_I(.)$ that applies to the pixel value I(p). The weighting functions $f_S(.)$ and $f_I(.)$ are generally chosen to be Gaussian functions with standard deviations $\sigma_S$ and $\sigma_I$, respectively.

According to the bilateral filter principle, the fundamental heuristic assumptions about the relationship between depth and intensity data may lead to erroneous copying of 2D texture into actually smooth geometries within the depth image. Furthermore, a second unwanted artifact known as edge blurring appears along depth edges that are not perfectly aligned with corresponding edges in the 2D image. In addition, the measured depth values of the input depth map R may be erroneous in edge pixels due to a mixture of light from the foreground and the background, or due to dynamic edge effects along edges of moving objects. These erroneous values of these pixels should not be considered in the filter.

To address these issues, Garcia et al. use a pixel-weighted average strategy (PWAS) with filters $J_2$ and $J_3$ defined by:

$$J_2(p) = \frac{\sum_{q \in N(p)} f_S(p,q) f_I(I(p), I(q)) Q(q) R(q)}{\sum_{q \in N(p)} f_S(p,q) f_I(I(p), I(q)) Q(q)} \quad \text{(Eq. 2)}$$

and $$J_3(p) = \frac{\sum_{q \in N(p)} f_S(p,q) f_R(R(p), R(q)) Q(q) R(q)}{\sum_{q \in N(p)} f_S(p,q) f_R(R(p), R(q)) Q(q)}, \quad \text{(Eq. 3)}$$

where Q(.) is a credibility map defined by $Q(q)=f_Q(|\nabla R(q)|)$, with $f_Q(.)$ being a (preferably Gaussian) weighting function (with variance $\sigma_Q$). The enhanced depth image is proposed to be calculated as:

$$J_4(p)=(1-Q(p)) \cdot J_2(p)+Q(p) \cdot J_3(p). \quad \text{(Eq. 4)}$$

The factor Q(.) takes into account that pixels located at edges of objects in the depth image are likely to cover part of the foreground and of the background at the same time and their depth value may thus be inaccurate or erroneous. Filter $J_2(.)$ is thus a cross-bilateral filter, in which the edge-blurring artifact is reduced by the factor Q(.). Filter $J_3(.)$ is a bilateral filter of the depth image, in which edge pixels are less weighted by factor Q(.). The enhanced depth image $J_4$ is obtained by blending $J_2(.)$ with $J_3(.)$. Eq. 4 uses the credibility map as a blending map, whereby pixels of the depth image with high reliability are taken over in the enhanced depth image essentially unchanged, thus avoiding texture copying.

BRIEF SUMMARY

The invention provides a refined depth image enhancement technique, which is not only applicable to enhancement of depth images acquired by a ToF camera but also to such images acquired using structured light or stereoscopy.

According to a first aspect of the invention a method for enhancing a depth image of a scene, comprises:
providing the depth image and an intensity image of the scene, each pixel of the depth image having a corresponding pixel in the intensity image (and vice versa);
calculating a first filtered depth image by applying a first filter to the depth image, the first filter comprising a cross bilateral filter that averages over pixels in the depth image while weighting contributions of the pixels over which is averaged by similarity of corresponding pixels in the intensity image;
calculating a second filtered depth image by applying a second filter to the depth image, the second filter comprising a bilateral filter that averages over pixels in the depth image while weighting contributions of the pixels over which is averaged by similarity of pixels in the depth image; and
calculating an enhanced depth image by blending the first filtered depth image with the second filtered depth image, the blending being achieved by application of a blending map, which defines, for each pixel of the enhanced depth image, a contribution thereto of the corresponding pixel of the first filtered depth image and of the corresponding pixel of the second filtered depth image.

For pixels in the depth image containing no depth value or an invalid depth value, the blending map defines a zero contribution of the corresponding pixel of the second filtered depth image and a 100% contribution of the corresponding pixel of the first filtered image. The method is preferably implemented on a computer or another suitable hardware such as a field-programmable gate array (FPGA), a microprocessor, an application specific integrated circuit (ASIC) or a system on chip (SoC).

As indicated above, problems may arise with the structured light when the reflected light power of the projected pattern is not strong enough to be detected by the sensor. Furthermore, since active triangulation methods require a baseline for depth estimation, there are always shadowed regions in which not depth value can be determined. As similar problem exists with depth images obtained by stereovision. In order to deal with such regions, it is proposed to fuse the depth maps (the depth images) with corresponding 2D images (acquired with the same or another camera).

It shall be noted that the depth image and the intensity image represent (image) the same part of a scene. The depth image and the intensity image have the same size in terms of number of pixels in width and height. To each pixel of the depth image thus corresponds one pixel in the intensity image and vice versa. For simplicity, corresponding pixels may thus be referred to by the same identifier (e.g. p or q), which indicates the pixel's position in the depth image and the intensity image, respectively. Each pixel of the depth image is said to "contain" a depth value, which represents the distance from the viewpoint to the point imaged by that pixel, if such depth value is available for that pixel. Pixels, for which no depth value could be obtained by direct measurement (such as with a ToF camera) or by triangulation (such as in stereo vision or using the structured light technique), are said to contain no or no valid depth value. It should be noted that irrespective of the specific terms used for the description of the invention, any suitable data structure for storing images can be used for the purpose of the present invention.

It shall be appreciated that the method according to the first aspect of the invention is based upon the same approach for calculating an enhanced depth image as the article "A New Multi-lateral Filter for Real-Time Depth Enhancement", by F. Garcia et al. However, deviating from the disclosure of that article, it is now proposed to weight the contributions of each pixel of the first and the second filtered depth image depending on whether the corresponding depth image pixel contains a valid depth value. If a valid depth value is not available for a given pixel, the corresponding pixel in the enhanced depth image will contain a depth value obtained exclusively by application of the first filter, i.e. the cross bilateral filter.

Preferably, the first filter is configured to exclude contributions of pixels containing no depth value or an invalid depth value.

The second filter may also be configured to exclude contributions of pixels containing no depth value or an invalid depth value.

Preferably, for pixels in the depth image containing a valid depth value, the blending map defines a contribution of the corresponding pixel of the first filtered depth image and of the corresponding pixel of the second filtered depth image that depends on a measure of homogeneity of intensity at the corresponding pixel in the intensity image. Advantageously, the contribution of the corresponding pixel of the first filtered depth image is reduced and the contribution of the corresponding pixel of the second filtered depth image increased with increasing homogeneity of intensity.

According to a second aspect of the invention, the second filtered depth image is replaced by the depth image itself. In this case, the method comprises:
providing the depth image and an intensity image of the scene, each pixel of the depth image having a corresponding pixel in the intensity image;
calculating a filtered depth image by applying a filter to the depth image, the filter comprising a cross bilateral filter that averages over pixels in the depth image while weighting contributions of the pixels over which is averaged by similarity of corresponding pixels in the intensity image;
calculating an enhanced depth image by blending the filtered depth image with the depth image, the blending being achieved by application of a blending map, which defines, for each pixel of the enhanced depth image, a contribution thereto of the corresponding pixel of the filtered depth image and of the corresponding pixel of the depth image;

For pixels in the depth image containing no depth value or an invalid depth value, the blending map defines a zero contribution of the corresponding pixel of the depth image and a 100% contribution of the corresponding pixel of the filtered image.

Preferably, the filter (which corresponds to the above-mentioned first filter) is configured to exclude contributions of pixels containing no depth value or an invalid depth value.

Preferably, for pixels in the depth image containing a valid depth value, the blending map defines a contribution of the corresponding pixel of the filtered depth image and of the corresponding pixel of the depth image that depends on a measure of homogeneity of intensity at the corresponding pixel in the intensity image. The contribution of the corresponding pixel of the filtered depth image is advantageously reduced and the contribution of the corresponding pixel of the depth image increased with increasing homogeneity of intensity.

According to a preferred embodiment of the invention, the enhanced depth image is may be upsampled to higher image resolution by interpolation. It should be noted that the initial depth image and the intensity image may be previously downsampled to lower resolution prior to application of the method. In this case, the subsequent upsampling may serve to revert to the initial high resolution.

A preferred aspect of the invention relates to a computer program, comprising computer-implementable instructions, which, when executed by a computer, cause the computer to execute the method described herein. A further preferred aspect of the invention relates to a data processing installation (e.g. a microprocessor, an application-specific integrated circuit, a field-programmable gate array or the like), comprising a (semiconductor or other) memory and a processor, the memory containing instructions implementable by the processor, which, when executed by the processor, cause the processor to execute the method described herein.

BRIEF DESCRIPTION OF THE DRAWINGS

Preferred embodiments of the invention will now be described, by way of example, with reference to the accompanying drawings in which.

DESCRIPTION OF PREFERRED EMBODIMENTS

Figure 1:
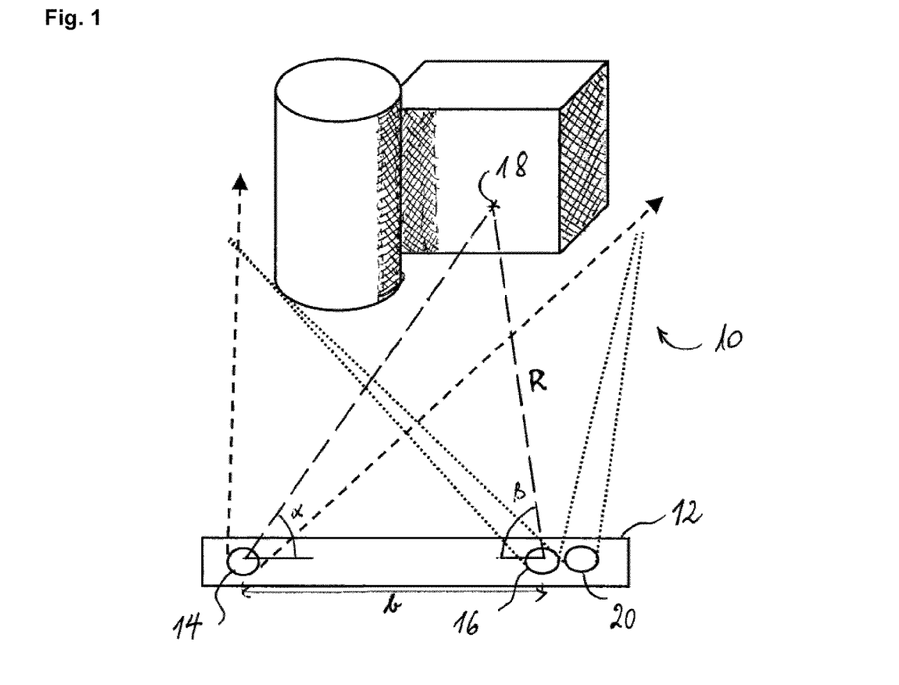
FIG. 1 is a schematic illustration of a setup for acquiring depth images and intensity images of a scene.

FIG. 1 schematically illustrates a setup for acquiring depth images and intensity images of scene 10 using the structured light technique. The sensor arrangement 12 comprises depth sensor that uses the structured light approach. The depth sensor includes a light source 14 (e.g. an IR laser or LED) emitting an illumination pattern into the scene 10 and a first camera 16, separated from the light source 14 by a baseline, observing the scene under an angle with respect to the illumination. The distance of an illuminated spot 18 in the scene 12 is determined by the depth sensor based upon the knowledge of the baseline b and the angles α and 13. The distance d of the spot 16 from the baseline is given by:

$$d = \frac{b \sin\alpha \sin\beta}{\sin(\alpha + \beta)}. \quad \text{(Eq. 5)}$$

The distance R from the first camera 16 to the illuminated spot is:

$$R = \frac{b \sin\alpha}{\sin(\alpha + \beta)}. \quad \text{(Eq. 6)}$$

Figure 2:
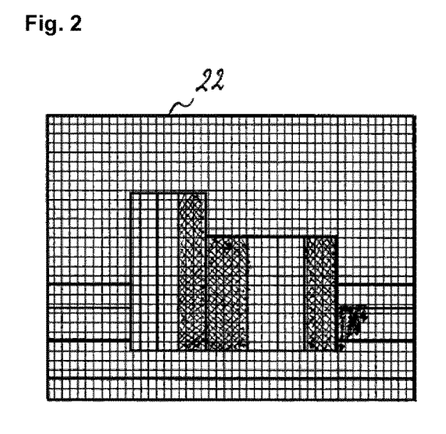
FIG. 2 is a schematic illustration of the depth image acquired by the depth sensor of the setup of FIG. 1.

As can be seen in FIG. 1, it will not be possible to attribute a depth value to every point in the scene due to shadowing. FIG. 2 schematically shows the depth image 22 acquired. Pixels corresponding to regions in the shadow of the light source 14 are crosshatched. For these pixels, no valid depth value can be determined by triangulation. Whereas shadowed regions can be reduced by using plural light sources, there may remain pixels in the depth image without a valid depth value. Such pixels typically occur at contours of objects, due to the finite resolution of the projected pattern.

Figure 3:
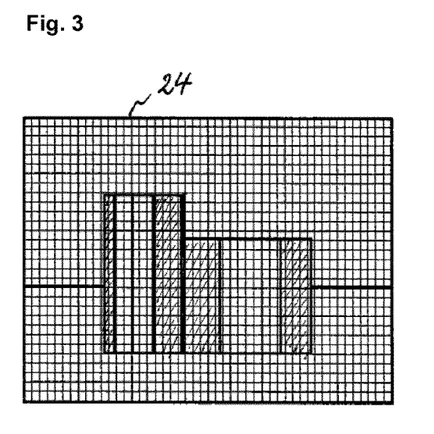
FIG. 3 is a schematic illustration of the intensity image acquired by video camera of the setup of FIG. 1.

The sensor arrangement 12 further comprises a second camera 20, the field of view of which essentially corresponds to the field of view of the first camera. The second camera 20 is a video camera, which takes intensity images (e.g. RGB or greyscale images) of the scene 10. FIG. 3 schematically illustrates the intensity image 24, acquired by the second camera, that corresponds to the depth image of FIG. 2.

The method according to the invention may be used to correct areas of the depth image containing no or unreliable depth values by taking the intensity image as a "guidance image". In practice, before the method according to the invention is used, it may be required to correct for different resolution of the first and second cameras and for the parallax. In the following it is assumed that pixel matching has already taken place, if necessary. In other words, for the pixel at the position (i,j) of the depth image, the corresponding pixel at position (i,j) in the intensity image images the same part of the scene.

In order to cope with regions of invalid pixels depth image, a so-called "occlusion map" V is introduced. V is a mask taking the value of zero for all pixel having no valid depth value and 1 for all other pixels.

1$^{st}$ Embodiment

According to a first preferred embodiment of the invention, a first filtered depth image $\{J'_2(p)\}_p$ is calculated by applying a first filter to the depth image, expressible as follows:

$$J'_2(p) = \frac{\sum_{q \in N(p)} f_S(p,q) f_I(I(p), I(q)) W(q) R(q)}{\sum_{q \in N(p)} f_S(p,q) f_I(I(p), I(q)) W(q)}. \quad \text{(Eq. 7)}$$

This first filter is a cross bilateral filter that averages over pixels in the depth image $\{R(p)\}_p$ while weighting contributions of the pixels over which is averaged by similarity of corresponding pixels in the intensity image $\{I(p)\}_p$. In the above equation, $f_S(.,.)$ is a spatial weighting term that applies to the pixel position p, and $f_I(.,.)$ is a range weighting term that applies to the pixel value I(p). The weighting functions $f_S(.,.)$ and $f_I(.,.)$ are Gaussian functions with standard deviations $\sigma_S$ and $\sigma_I$, respectively. The weighting map $\{W(p)\}_p$ is defined by:

$$W(p) = V(p) \cdot Q_R(p), \quad \text{(Eq. 8)}$$

where V is the occlusion map and $$Q_R(p) = \exp\left(\frac{-(\nabla R(p))^2}{2\sigma_Q^2}\right) \quad \text{(Eq. 9)}$$

defines the so-called "credibility map" Q. $\nabla R(p)$ represents the gradient of the depth map at pixel p, which means that zones with high differences in depth value from one pixel to at least one of its adjacent pixels are considered unreliable and are given less weight in the computed average.

The factor V(q) guarantees that pixels containing no valid depth value provide no contribution to the average being calculated and attributed to pixel p.

A second filtered depth image is calculated as follows:

$$J'_3(p) = \frac{\sum_{q \in N(p)} f_S(p,q) f_R(R(p), R(q)) V(q) R(q)}{\sum_{q \in N(p)} f_S(p,q) f_R(R(p), R(q)) V(q)} \quad \text{(Eq. 10)}$$

The second filter $\{J'_3(p)\}_p$ is a bilateral filter that averages over pixels in the depth image while weighting contributions of the pixels over which is averaged by similarity of pixels in the depth image. $f_R(.,.)$ is a Gaussian weighting function with standard deviation $\sigma_R$. As for the first filter, the factor V(q) guarantees that pixels containing no valid depth value make no contribution to the average that is calculated for pixel p.

Finally, the an enhanced depth image $\{J'_4(p)\}_p$ is obtained by blending the first filtered depth image $J'_2(p)\}_p$ with the second filtered depth image $J'_3(p)\}_p$:

$$J'_4(p) = (1 - B(p)) \cdot J'_2(p) + B(p) \cdot J'_3(p) \quad \text{(Eq. 11)}$$

where $\{B(p)\}_p$ is a blending map that defines, for each pixel p, a contribution to the enhanced depth image of pixel p of the first filtered depth image $J'_2(p)$ and pixel p of the second filtered depth image $J'_3(p)$.

The blending map is defined such that B(p) is 0 for any pixel p containing no or no valid depth value. For such pixels, only the first filtered image contributes to the enhanced depth image (contribution of 100% since 1−B(p)=1). In order to achieve this property, $\{B(p)\}_p$ may advantageously be defined as:

$$B(p) = V(p) \cdot Q_R(p) \quad \text{(Eq. 12)}$$

in which case B=W.

However, the blending map can be further simplified by using instead of W e.g. a binary mask, which can be obtained by applying a threshold t (with t>0) to W:

$$B(p) = \begin{cases} 1 & \text{if } V(p) \cdot Q_R(p) > t \\ 0 & \text{otherwise} \end{cases} \quad \text{(Eq. 13)}$$

Using the credibility in the blending map may still provoke an edge blurring in unreliable depth pixels if no 2D edge (steep change of intensity value) is present. Indeed, this situation occurs when foreground and background objects share (approximately) the same intensity value. The blending map may be modified in such a way that one relies less on the intensity image in regions with homogeneous intensity values. An "intensity blending map" $\{B_I(p)\}_p$ is defined as follows:

$$B_I(p) = \begin{cases} 1 & \text{if } I(p) \text{ is homogeneous} \\ 0 & \text{otherwise,} \end{cases} \quad \text{(Eq. 14)}$$

where the condition "I(p) is homogeneous" may be considered satisfied if the gradient of the intensity image in pixel p is below a certain threshold $t_I$: I(p) is homogeneous $\Leftrightarrow |\nabla I(p)| < t_I$. Instead of this binary condition for I being homogeneous at a pixel p, one may also introduce a continuous measure of the homogeneity of I, e.g. by calculating the value of an exponential function of the gradient of I as $$B_I(p) = \exp\left(\frac{-(\nabla I(p))^2}{2\sigma_I^2}\right) \quad \text{(Eq. 14')}$$

The variance $\sigma_I$ of exponential function is then a fixed parameter that plays the role as the threshold $t_I$ for the binary homogeneity measure in equation 14.

To take unreliable pixels in the intensity image into account, one may define the blending map B as follows:

$$B(p) = V(p) \cdot Q_R(p) \cdot [1 + B_I(1 - V(p) \cdot Q_R(p))] \quad \text{(Eq. 15)}$$

It shall be noted that whichever of equations 12, 13 and 15 is substituted into equation 9, the contribution of the first filtered image will always be set to 0 for pixels without a valid depth value.

The intensity blending map $B_I$ is preferably dilated, e.g. by applying a minimum filter, in order obtain low values for $B_I$ in the whole neighborhood of an edge pixel and not only in the pixel itself. The map $V(p)Q_R(p)$ may also be dilated to compensate any misalignments between the intensity image I and the depth image R, which are likely to occur if the depth image and the intensity image are received from different sensors.

2<sup>nd</sup> Embodiment

According to a second preferred embodiment of the invention, the enhanced depth image (noted $\{J''_4(p)\}_p$) is calculated by:

$$J''_4(p) = (1 - B(p)) \cdot J'_2(p) + B(p) \cdot R(p), \quad \text{(Eq. 16)}$$

where the above definition of $J'_2(p)$ still holds (Eq. 7) and where the blending map B may be defined as in any one of equations 12, 13 and 15.

The calculation of the enhanced range image by equation 16 differs from the calculation according to equation 11 only in that the depth map R replaces the second filtered range image $J'_3$. Eq. 11 may be preferred over eq. 16 if the depth image R is noisy. In the noise level of the depth image is low, one should prefer calculation based on eq. 16, which is less computationally costly.

For real-time application, computation of the first (and possibly the second) filtered depth image and of the blending map in full resolution may be unsuitable. (However, this depends on the available hardware.) One may use downsampled versions of the depth image and of the intensity image. In addition, the blending map B, the occlusion map V and the weighting map may be downsampled, before they are used in the different equations. The dilation of B may be incorporated into the downsampling. The dilation and the downsampling, using a minimum filter of kernel size 2s+1, may be calculated by $$B_{\downarrow s}(p) = \min_q B(q) \text{ such that } \|q-p\|_1 \leq s. \quad \text{(Eq. 17)}$$

It may be noted that this operation only need to be performed on the reduced number of pixels that are kept in the downsampled image. The dilation and downsampling may be performed on the compound blending map obtained from equation 15 or separately on VQ and $B_I$ using different dilation kernel sizes.

Figure 4:
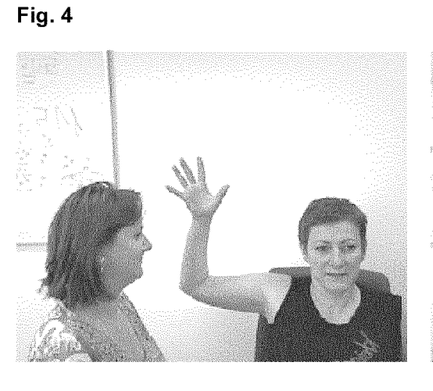
FIG. 4 is an example intensity image.
Figure 5:
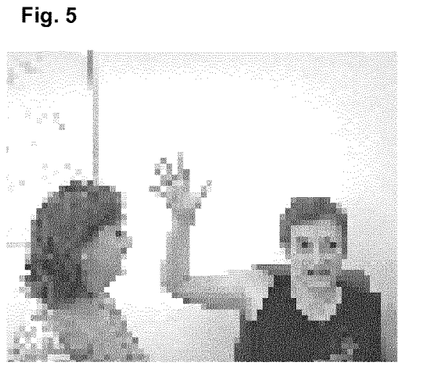
FIG. 5 is the example intensity image in low resolution.
Figure 6:
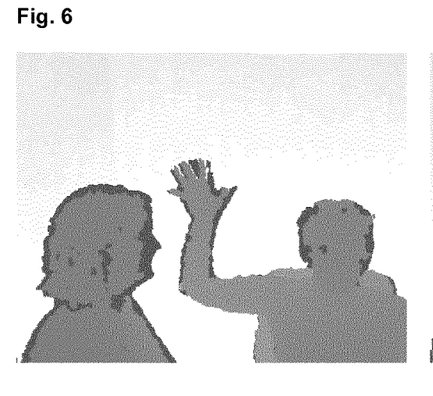
FIG. 6 is the depth image corresponding to the intensity image of FIG. 4 (before enhancement)
Figure 7:
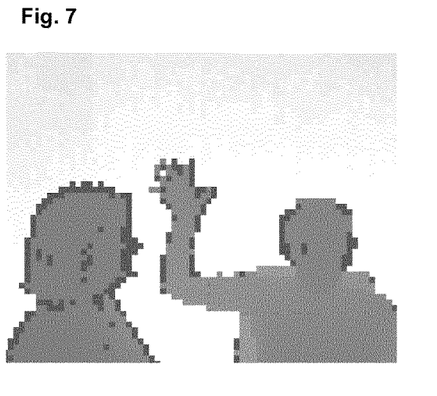
FIG. 7 is the depth image of FIG. 6 in low resolution.
Figure 8:
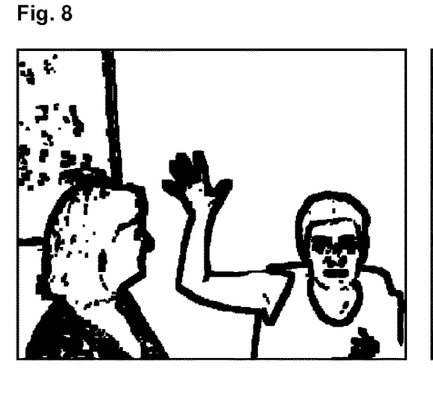
FIG. 8 is a so-called intensity blending map corresponding to FIG. 4.
Figure 9:
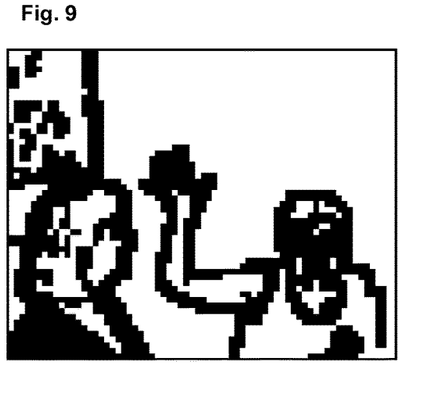
FIG. 9 is the intensity blending map in low resolution.
Figure 10:
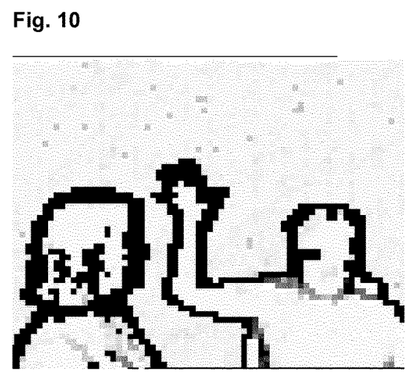
FIG. 10 is a so-called the weight map, which is the product of the occlusion map and the credibility map corresponding to FIG. 6.
Figure 11:
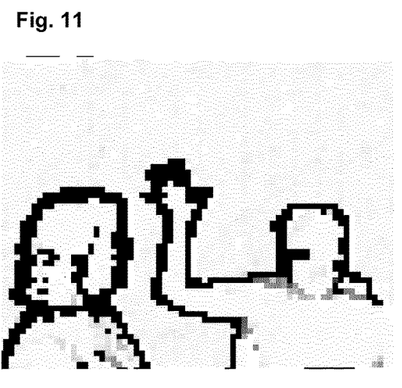
FIG. 11 is a blending map obtained by combining the intensity blending map of FIG. 6 and the weight map of FIG. 10.
Figure 12:
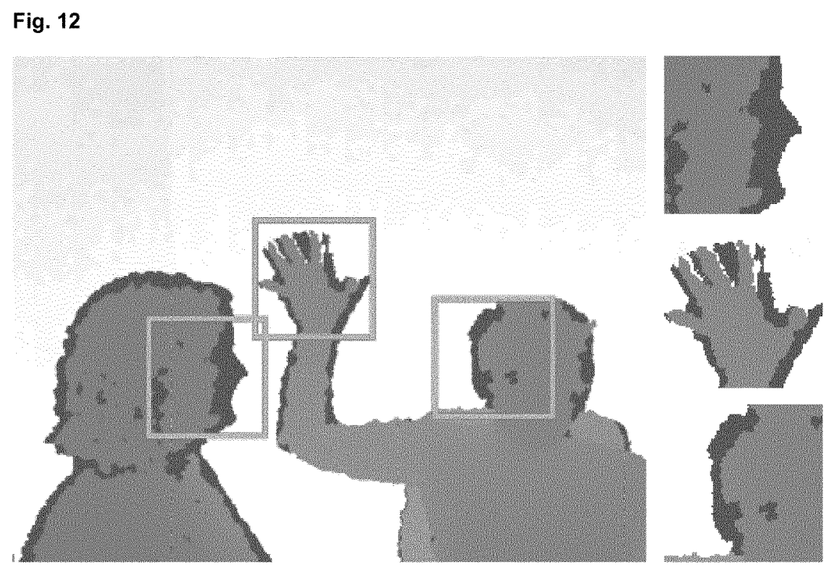
FIG. 12 is an enlarged copy of the depth image of FIG. 6, with three picture details.
Figure 13:
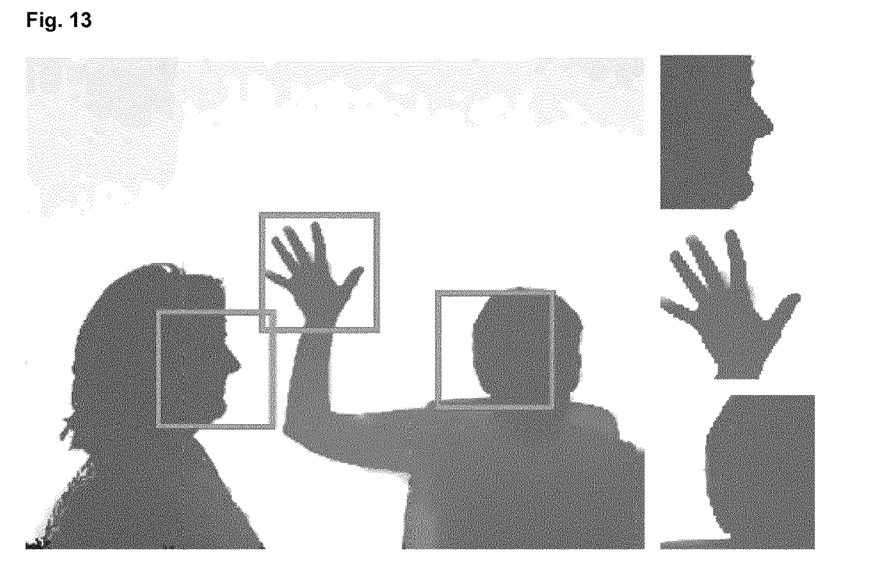
FIG. 13 is the enhanced depth image obtained by application of the method according to a preferred embodiment of the invention.

FIGS. 4 to 9 illustrate application of the method according to the invention on example data acquired using a Kinect™ camera. FIG. 4 shows the high-resolution intensity image (I), FIG. 5 a downsampled version thereof. FIG. 6 shows the high-resolution depth image (before enhancement in accordance with the method). A downsampled version of the depth image is given in FIG. 7. FIGS. 8 and 9 shows the intensity blending map ($B_I$, calculated using eq. 14 or 14') in high and low resolution respectively (black stands for $B_I$=0; white for $B_I$=1). FIG. 10 illustrates the weight map VQ computed in accordance with eq. 12 (black pixels stand for VQ(p)=0). FIG. 11 is the blending map B resulting from combining the intensity blending map of FIG. 8 with the weight map VQ of FIG. 11 in accordance with eq. 15 (black pixels stand for B(p)=0). FIG. 12 is an enlarged version of FIG. 6, with three picture details. The dark borders correspond to pixels without a depth value. FIG. 13 is the enhanced depth image obtained through application of the filter of eq. 16. As can be seen, the contours in the enhanced depth image neatly correspond to the contours in the intensity image.

While specific embodiments have been described in detail, those skilled in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

In particular, whereas the method according to the invention has been illustrated with reference to a depth image acquired using the structured light technique, it will be appreciated that the method may equally be applied for enhancing depth images acquired using a ToF 3D camera or stereoscopy.

The invention claimed is:

1. A method of enhancing a depth image of a scene, comprising:
providing said depth image and an intensity image of said scene, each pixel of said depth image having a corresponding pixel in said intensity image;
calculating a first filtered depth image by applying a first filter to said depth image, said first filter comprising a cross bilateral filter that averages over pixels in said depth image while weighting contributions of the pixels over which is averaged by similarity of corresponding pixels in said intensity image;
calculating a second filtered depth image by applying a second filter to said depth image, said second filter comprising a bilateral filter that averages over pixels in said depth image while weighting contributions of the pixels over which is averaged by similarity of pixels in said depth image;
calculating an enhanced depth image by blending said first filtered depth image with said second filtered depth image, said blending being achieved by application of a blending map, which defines, for each pixel of said enhanced depth image, a contribution thereto of the corresponding pixel of said first filtered depth image and of the corresponding pixel of said second filtered depth image;
wherein said blending map includes a credibility map representing a gradient function of said depth image for each pixel and a binary mask that, for pixels in said depth image containing no depth value or an invalid depth value, defines a zero contribution of the corresponding pixel of said second filtered depth image and a 100% contribution of the corresponding pixel of said first filtered image.

2. The method as claimed in claim 1, wherein said first filter is configured to exclude from the average calculation contributions of pixels containing no depth value or an invalid depth value.

3. The method as claimed in claim 1, wherein said second filter is configured to exclude from the average calculation contributions of pixels containing no depth value or an invalid depth value.

4. The method as claimed in claim 1, wherein, for pixels in said depth image containing a valid depth value, said blending map defines a contribution of the corresponding pixel of said first filtered depth image and of the corresponding pixel of said second filtered depth image that depends on a measure of homogeneity of intensity at the corresponding pixel in said intensity image.

5. The method as claimed in claim 4, the contribution of the corresponding pixel of said first filtered depth image being reduced and the contribution of the corresponding pixel of said second filtered depth image being increased with increasing homogeneity of intensity.

6. A method of enhancing a depth image of a scene, comprising:
providing said depth image and an intensity image of said scene, each pixel of said depth image having a corresponding pixel in said intensity image;
calculating a filtered depth image by applying a filter to said depth image, said filter comprising a cross bilateral filter that averages over pixels in said depth image while weighting contributions of the pixels over which is averaged by similarity of corresponding pixels in said intensity image;
calculating an enhanced depth image by blending said filtered depth image with said depth image, said blending being achieved by application of a blending map, which defines, for each pixel of said enhanced depth image, a contribution thereto of the corresponding pixel of said filtered depth image and of the corresponding pixel of said depth image;

wherein said blending map includes a credibility map representing a gradient function of said depth image for each pixel and a binary mask that, for pixels in said depth image containing no depth value or an invalid depth value, defines a zero contribution of the corresponding pixel of said depth image and a 100% contribution of the corresponding pixel of said filtered image.

7. The method as claimed in claim 6, wherein said filter is configured to exclude from the average calculation contributions of pixels containing no depth value or an invalid depth value.

8. The method as claimed in claim 6, wherein, for pixels in said depth image containing a valid depth value, said blending map defines a contribution of the corresponding pixel of said filtered depth image and of the corresponding pixel of said depth image that depends on a measure of homogeneity of intensity at the corresponding pixel in said intensity image.

9. The method as claimed in claim 8, the contribution of the corresponding pixel of said filtered depth image being reduced and the contribution of the corresponding pixel of said depth image being increased with increasing homogeneity of intensity.

10. The method as claimed in claim 1, wherein said enhanced depth image is upsampled to higher image resolution by interpolation.

11. A non-transitory computer program product, comprising computer-implementable instructions, which, when executed by a computer, cause said computer to perform the method of claim 1, wherein the non-transitory computer program product is stored on a computer readable medium.

12. A data processing installation, comprising a memory and a processor, said memory containing processor-implementable instructions for enhancing a depth image of a scene, which, when executed by said processor, cause said data processing installation to:
provide said depth image and an intensity image of said scene, wherein each pixel of said depth image has a corresponding pixel in said intensity image;
calculate a first filtered depth image by applying a first filter to said depth image, wherein said first filter comprises a cross bilateral filter that averages over pixels in said depth image while weighting contributions of the pixels over which is averaged by similarity of corresponding pixels in said intensity image;
calculate a second filtered depth image by applying a second filter to said depth image, wherein said second filter comprises a bilateral filter that averages over pixels in said depth image while weighting contributions of the pixels over which is averaged by similarity of pixels in said depth image;
calculate an enhanced depth image by blending said first filtered depth image with said second filtered depth image, wherein said blending being achieved by application of a blending map, which defines, for each pixel of said enhanced depth image, a contribution thereto of the corresponding pixel of said first filtered depth image and of the corresponding pixel of said second filtered depth image;
wherein said blending map includes a credibility map representing a gradient function of said depth image for each pixel and a binary mask that, for pixels in said depth image containing no depth value or an invalid depth value, defines a zero contribution of the corresponding pixel of said second filtered depth image and a 100% contribution of the corresponding pixel of said first filtered image.

13. The method as claimed in claim 1, wherein in said calculating the first filtered depth image by applying said first filter to said depth image, said first filter comprising the cross bilateral filter that averages over pixels in said depth image while weighting contributions of the pixels over which is averaged by similarity of corresponding pixels in said intensity image uses an occlusion map, and wherein in calculating the second filtered depth image by applying said second filter to said depth image, said second filter comprising the bilateral filter that averages over pixels in said depth image while weighting contributions of the pixels over which is averaged by similarity of pixels in said depth image uses the occlusion map.

14. The method as claimed in claim 13, wherein said first filter is configured to exclude from the average calculation contributions of pixels containing no depth value or an invalid depth value by applying the occlusion map.

15. The method as claimed in claim 14, wherein said second filter is configured to exclude from the average calculation contributions of pixels containing no depth value or an invalid depth value by applying the occlusion map.

16. The method as claimed in claim 6, wherein in said calculating the first filtered depth image by applying said filter to said depth image, said filter comprising the cross bilateral filter that averages over pixels in said depth image while weighting contributions of the pixels over which is averaged by similarity of corresponding pixels in said intensity image uses an occlusion map, and wherein, for pixels in said depth image containing no depth value or an invalid depth value, said blending map defines a zero contribution of the corresponding pixel of said depth image and a 100% contribution of the corresponding pixel of said filtered image using the occlusion map.

17. The method as claimed in claim 16, wherein said filter is configured to exclude contributions of pixels containing no depth value or an invalid depth value using the occlusion map.

18. The method as claimed in claim 12, wherein in said calculate the first filtered depth image by applying said first filter to said depth image, said first filter comprising the cross bilateral filter that averages over pixels in said depth image while weighting contributions of the pixels over which is averaged by similarity of corresponding pixels in said intensity image uses an occlusion map, and wherein calculate the second filtered depth image by applying said second filter to said depth image, said second filter comprising the bilateral filter that averages over pixels in said depth image while weighting contributions of the pixels over which is averaged by similarity of pixels in said depth image uses the occlusion map.

* * * * *